United States Patent [19]

Wirfelt

[11] 4,158,522
[45] Jun. 19, 1979

[54] METHODS AND APPARATUS FOR DETACHABLY FASTENING A TOOL SHAFT TO A TOOL HOLDER

[75] Inventor: Sven A. O. Wirfelt, Sandviken, Sweden

[73] Assignee: Sandvik Aktiebolag, Sandviken, Sweden

[21] Appl. No.: 851,350

[22] Filed: Nov. 14, 1977

[30] Foreign Application Priority Data

Nov. 11, 1976 [SE] Sweden ................. 7612628

[51] Int. Cl.² .............. B23B 35/00; B23B 51/00; B23B 31/00
[52] U.S. Cl. .................. 408/1 BD; 408/59; 408/199; 408/705; 279/1 Q; 279/1 W
[58] Field of Search ............ 279/1 Q, 1 W, 20, 42, 279/103; 408/1, 59, 60, 199, 231, 238, 239, 154, 156, 163, 705

[56] References Cited

U.S. PATENT DOCUMENTS

| | | | |
|---|---|---|---|
| 2,426,200 | 8/1947 | Green | 279/1 Q |
| 3,094,338 | 6/1963 | Page | 279/1 Q |
| 3,215,443 | 11/1965 | Irving | 279/20 |
| 3,672,256 | 6/1972 | Kosmowski | 279/103 |

Primary Examiner—Harrison L. Hinson
Attorney, Agent, or Firm—Burns, Doane, Swecker & Mathis

[57] ABSTRACT

A tool shaft is detachably fastened in a tool holder by means of a plurality of gaskets which are each sandwiched between a pair of press rings. The tool shaft extends through the press rings and gaskets. A screw is provided for compressing the gaskets between the press rings. The gaskets are disposed in recesses of larger volume. The gaskets are nonsymmetrical about the longitudinal axis of the tool shaft. When compressed, the gaskets force the tool shaft laterally against the rings to prevent radial misalignment of the tool shaft.

9 Claims, 2 Drawing Figures

A—A

मेthods AND APPARATUS FOR DETACHABLY FASTENING A TOOL SHAFT TO A TOOL HOLDER

BACKGROUND AND OBJECTS OF THE INVENTION

This invention relates to apparatus and methods for detachably fastening a tool shaft, preferably a drill shaft, in a tool holder. The tool holder is preferably of the type intended for so-called gun drills, and is to be fastened in a drilling machine chuck. Gun drills used for long-hole drilling are provided with a hole passing through the drill for supplying cooling medium under high pressure to the cutting zone.

There has been a need for a tool holder for drills which permits a detachable, secure fastening of the drill. In a previous proposal a round, unprofiled part of the tool shaft, or a profile of the tool shaft evolving into a round part, is to be fastened to a tool holder by means of welding or soldering, as disclosed, for instance, in Canadian Pat. No. 670,003. However, this leads to problems if the drill is to be exchanged without exchanging the tool holder. Therefore, since as a rule, every drill would have to be provided with its own tool holder which involves an unnecessary increase in cost.

According to another publication, viz., U.S. Pat. No. 3,120,768, a profiled drill is to be detachably fastened in a tool holder. An unprofiled part of the drill shaft is soldered to the wall of the tool holder. In order to further assure that the drill does not revolve relative to the tool holder, and in order to prevent leakage of cooling medium between the drill and the tool holder, the outer part of the tool holder is pressed inwardly to bear quite firmly against the profiled part of the drill. In this case exchanging the drill without exchanging the tool holder involves an unnecessarily complicated and expensive procedure.

A third publication, viz., Swedish Pat. No. 226,867, discloses a tool shaft which is detachably fastened to a holder. The drill, which is intended for an easier type of drilling (for instance in dentistry), is fastened in the holder only by means of compressed O-ring gaskets. As a result, this type of drill is quite unsuitable for heavy drilling where great torsional moments are to be transmitted from the holder to the drill shaft. Moreover, a drill with this type of fastening would be unsuitable for instance for long-hole drilling, since the drill shaft would exhibit excessive mobility in the radial direction. This presents significant difficulties in drilling long, straight holes.

An object of the present invention is to eliminate these drawbacks and allow a simple and secure detachable fastening of unprofiled or profiled drill shafts in a tool holder.

BRIEF SUMMARY OF A PREFERRED EMBODIMENT OF THE INVENTION

These objects are achieved by means of a gasket in the holder which surrounds the tool shaft. The gasket is nonsymmetrical relative to the longitudinal axis of the tool holder. When the gasket is compressed, it tends to shift the tool shaft laterally against a rigid member in the tool holder.

THE DRAWING

The invention will be described more closely with reference to the enclosed drawing, in which:

FIG. 1 is a longitudinal section taken through a tool holder with a profiled drill shaft fastened to it; and FIG. 2 is a cross-section taken along the line A—A of FIG. 1.

DETAILED DESCRIPTION OF A PREFERRED EMBODIMENT OF THE INVENTION

Figure 1:
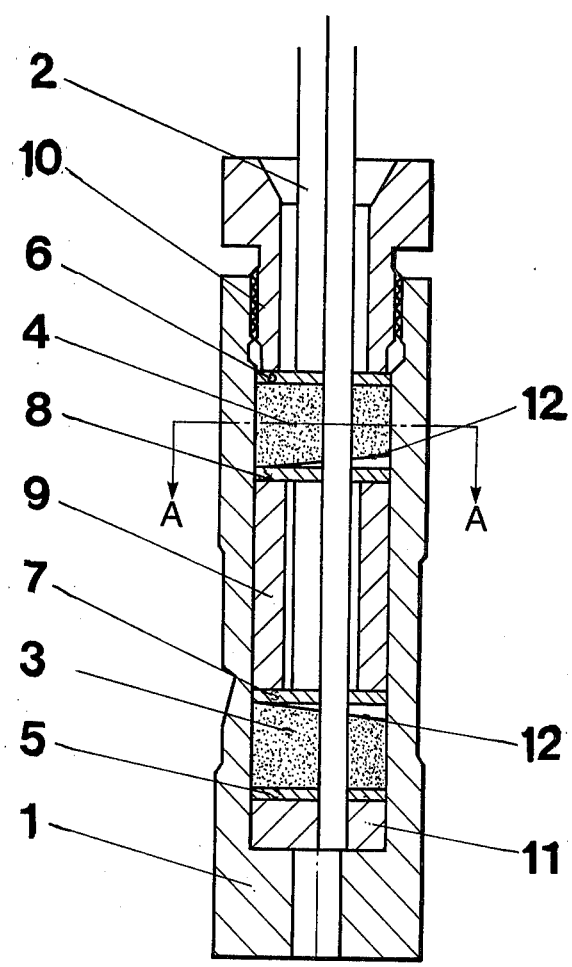

In a tool holder 1 there is detachably fastened a profiled (or unprofiled, if desired), drill shaft 2, which can be either solid or tubular. The drill shaft is fixed in the holder by means of cylindrical gaskets 3, 4 of rubber or other elastic material cooperating with press rings. The press rings comprise centering rings and support rings. In this connection a centering ring 5, 6 is placed at one end of the gasket 3, 4 and a support ring 7, 8 at the other end. Between the support rings 7, 8 is disposed a spacer ring 9. A hollow screw 10 surrounds the drill shaft and can be screwed into the tool holder, whereby it directly imparts inward longitudinal forces on the centering ring 6 to compress the gaskets.

The gaskets, centering rings and support rings are provided with center holes, the shape of which being the same as that of the drill shaft. The center holes of the centering rings and the support rings are preferably made somewhat larger than the drill shaft in order to assure that the rings can be mounted on the drill shaft.

Figure 2:
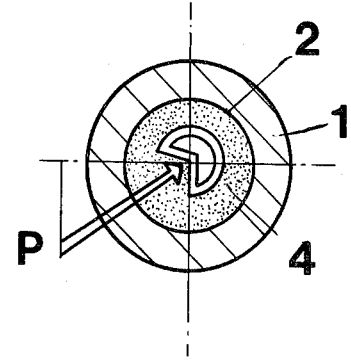

The cylindrical gaskets 3, 4 each have at least one end surface bevelled at 12, the gaskets being of less volume than the recess. Each support ring and its associated centering ring forms a cylindrical recess for receiving the gasket. When the gasket is uncompressed, a portion of the recess is unoccupied. The gasket and the unoccupied recess portion are nonsymmetrical about the tool axis. When the screw 10 is tightened, the beveled gaskets 3, 4 are compressed in a lateral power direction P (see FIG. 2) and thereby press the drill shaft laterally against the centering rings and the support rings. In this connection the gasket will be forced in the direction into which it is beveled, i.e., into the unoccupied recess portion. This means that even if, when uncompressed, the gasket surrounds a profiled drill shaft, it will be forced into the profiled part of the drill shaft when compressed. Owing to this fact, the gasket will closely encompass the whole drill shaft. Moreover, during the tightening of the screw the gasket will be forced laterally outwardly against the inner wall of the tool holder to form a fluid seal. This fact is of substantial importance, since the cooling medium forced through the drill under high pressure, would otherwise leak between the drill shaft and the inner wall of the tool holder.

If the cylindrical gaskets have planar end surfaces, rather than beveled surfaces and are disposed in the illustrated recesses, the tool shaft would not be forced laterally against the centering rings and the support rings, and the drill would have a certain mobility in the radial direction. This fact would lead to great problems for instance when drilling long holes since a certain lateral force on the drill would move the drill obliquely in the hole which would misalign the drill. Therefore, it is an essential feature of the invention to form the gaskets in such a way that when compressed they will force the tool shaft against the rigid centering rings and the rigid support rings. Thanks to that vigorous contact against the centering rings and support rings the tool shaft is firmly anchored in the tool holder as is necessary when drilling long holes.

In order to transmit torsional moment from the tool holder to the drill shaft, there is according to the described embodiment a driver member 11 which is fastened to the tool holder and which is provided with a center hole corresponding to the shape of the drill shaft. Other arrangements for transferring the torsional moment can be devised if desired.

In accordance with the invention, the drill can be easily removed from tne holder for replacement, and yet is firmly held in place against lateral displacement. Hence, misalignment of the tool is vigorously resisted.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. Apparatus comprising a tool holder, a tool shaft, means carried by said tool holder for transmitting torsional movement to said tool shaft, and means for detachably fastening said tool shaft to said tool holder comprising a plurality of gaskets surrounding said tool shaft, and press rings for compressing said gaskets, said gaskets being nonsymmetrical relative to a longitudinal axis of said tool shaft.

2. Apparatus according to claim 1, wherein the gaskets are formed of elastic material and are generally cylindrical with at least one end surface thereof beveled to establish said nonsymmetrical relationship.

3. Apparatus according to claim 1, wherein the press rings comprise a centering ring and a support ring disposed at opposite ends of each gasket.

4. Apparatus according to claim 3, further including a spacer ring disposed between the support rings.

5. Apparatus according to claim 4, including a hollow screw threadable into longitudinal engagement with one of said centering rings for compressing said gaskets.

6. In an apparatus comprising a tool holder, a tool shaft, and means for detachably fastening said tool shaft to said tool holder, said fastening means comprising:
rigid press means in said tool holder for receiving said tool shaft,
a gasket disposed in a recess surrounding said tool shaft and positioned for being compressed by inward longitudinal forces imposed on said press means,
said gasket, in an uncompressed state, having less volume than said recess so that a portion of said recess is unoccupied, said unoccupied portion being nonsymmetrical relative to a longitudinal axis of said tool shaft,
displaceable means for imposing an inward longitudinal force on said press member to compress said gasket in a manner causing said gasket to occupy said unoccupied and simultaneously urge said tool shaft radially firmly against said press means.

7. Apparatus according to claim 6 wherein said press means comprises a centering ring at one end of said gasket and a support ring at the other end of said gasket, said rings each including an aperture receiving said tool shaft, said recess being defined between said rings and being generally cylindrical and said gasket being generally cylindrical with one end beveled.

8. Apparatus according to claim 7, wherein said displaceable means comprises a hollow screw which receives said tool shaft, said screw being tightenable against one of said rings to compress said gasket.

9. A method for fastening a tool shaft in a tool holder comprising the steps of: positioning a gasket in a recess surrounding said tool shaft, such that a portion of said recess remains unoccupied by said gasket in an uncompressed state of said gasket, and compressing said gasket so that said gasket tends to occupy said unoccupied recess portion in a direction laterally of the longitudinal axis of said tool shaft, to urge said tool shaft firmly against a rigid member in said tool holder.

* * * * *